United States Patent
Moisson-Franckhauser

[15] 3,646,249
[45] Feb. 29, 1972

[54] SUPERCONDUCTOR

[72] Inventor: Francois Moisson-Franckhauser, Bretigny-sur-Orge, France

[73] Assignee: Compagnie Generale d'Electricite, Paris, France

[22] Filed: July 14, 1970

[21] Appl. No.: 54,714

[52] U.S. Cl.................174/126, 174/15 C, 174/DIG. 6, 335/216
[51] Int. Cl.....................H01b 5/00, H01b 7/34
[58] Field of Search............174/15, 15 C, DIG. 6, 126, 174/128; 335/216

[56] References Cited

UNITED STATES PATENTS

| 3,472,944 | 10/1969 | Morton et al.............174/15 |
| 3,527,873 | 9/1970 | Brechna et al............174/15 |
| 3,502,789 | 3/1970 | Barber et al.............174/15 X |
| 3,427,391 | 2/1969 | Bernert et al............174/15 |

FOREIGN PATENTS OR APPLICATIONS

| 1,130,464 | 10/1968 | Great Britain..........174/DIG. 6 |
| 1,095,535 | 12/1967 | Great Britain..........174/DIG. 6 |
| 1,505,605 | 11/1967 | France..................174/DIG. 6 |

*Primary Examiner*—Lewis H. Myers
*Assistant Examiner*—A. T. Grimley
*Attorney*—Sughrue, Rothwell, Mion, Zinn and Macpeak

[57] ABSTRACT

An electrical superconductor comprises a hollow prismatic member consisting of a cylindrical tube covered with an extra layer of the slightly resistive material to form the external shape, and containing superconductor elements, and a lining of mechanically strong material, fixed onto the prismatic member.

2 Claims, 5 Drawing Figures

INVENTOR
FRANCOIS MOISSON-FRANCKHAUSER

BY Sughrue, Rothwell, Mion,
Zinn & Macpeak
ATTORNEYS

Patented Feb. 29, 1972

SUPERCONDUCTOR

BACKGROUND OF THE INVENTION

1. Field of the Invention

The present invention concerns a stabilized superconducting cable with which it is possible to obtain a high-current density and of which the mechanical properties, notably the tensile strength, are very satisfactory.

2. Description of the Prior Art

It is known to construct a stabilized superconducting cable in the form of a tube consisting of a metal having good electric conductivity in which there are inserted wires or strips of superconducting material, and which is provided with a sheathing consisting of mechanically strong material, for example, a aluminum alloy, which can be extruded around the tube.

SUMMARY OF THE INVENTION

The present invention relates to a superconducting cable in which the extruded sheathing is replaced by a base consisting of a material of much greater mechanical strength, such as steel, but which cannot be extruded. The stabilized superconducting cable according to the present invention is characterized by the fact that it comprises:

1. a hollow, preferably prismatic, member or portion made of a material having very low resistivity at low temperature, such as very pure aluminum,
2. superconductor elements embedded in the hollow portion of low resistivity, preferably in the form of wires or strips regularly distributed around the cavity of the hollow portion, and
3. a base consisting of a material of high-mechanical strength which is fast with the said hollow portion.

In a particular embodiment, the hollow portion has a square or rectangular external cross section. The base bears against one of the faces of the hollow portion and comprises two edges which are bent over in such manner as to be embedded in the hollow portion.

In accordance with another constructional variant, the superconductor elements are helically disposed around the cavity of the hollow portion.

Another object of the present invention consists in a method of manufacturing a cable as previously described. In a first manufacturing phase, there is produced, for example by extrusion, a cylindrical tube consisting of a material having low resistivity at low temperature, in which there are embedded superconductor strands parallel to the axis of the said tube and regularly distributed around the cavity. In a second phase, a permanent deformation is applied to the tube by twisting in such manner that the said superconductor strands are helical. In a third phase, the deformed tube is associated with a base consisting of a material which has good mechanical strength, in the form of a strip whose edges, which are optionally rectilinear, are bent over, further material similar to that of which the tube is formed surrounds the latter and is inserted under the said bentover edges of the base. The external form of this further material gives the form of the cable thus obtained.

BRIEF DESCRIPTION OF THE DRAWINGS

The invention will be more readily understood from the example given in the following with reference to the accompanying drawings in which.

DESCRIPTION OF THE PREFERRED EMBODIMENT

Figure 5:
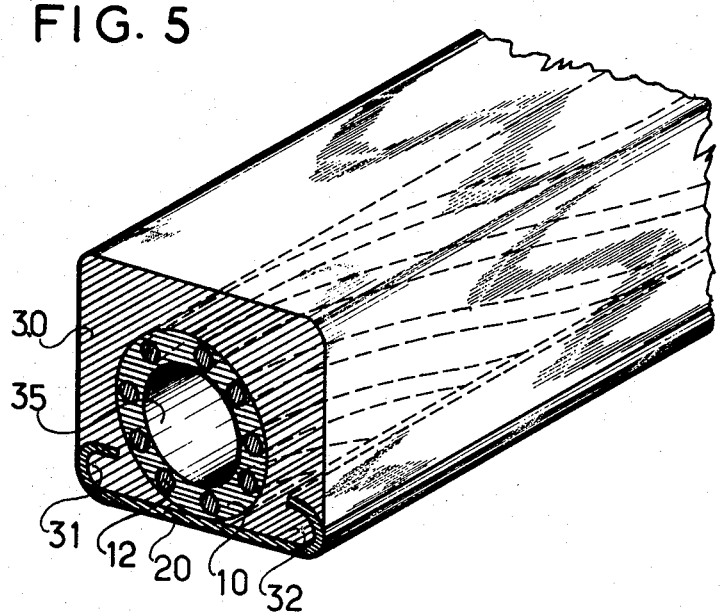
FIGS. 5 illustrates in perspective the cable according to the invention.

The method of manufacture hereinafter described leads to the production of a stabilized superconducting cable as illustrated in FIG. 5.

Figure 1:
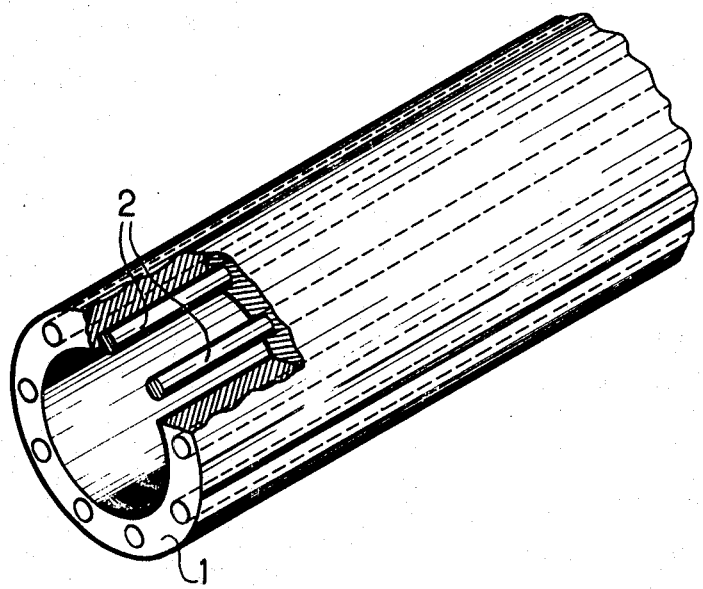
FIGS. 1 and 2 are perspective views which illustrate a tube provided with superconductor wires before and after deformation, respectively.

FIG. 1 illustrates a hollow cylindrical tube 1 consisting of a material having good conductivity at low temperature, in which there are embedded strands 2 of superconductor material. These strands may be either wires or strips. It is advantageous and convenient to obtain this tube by extrusion.

Figure 2:
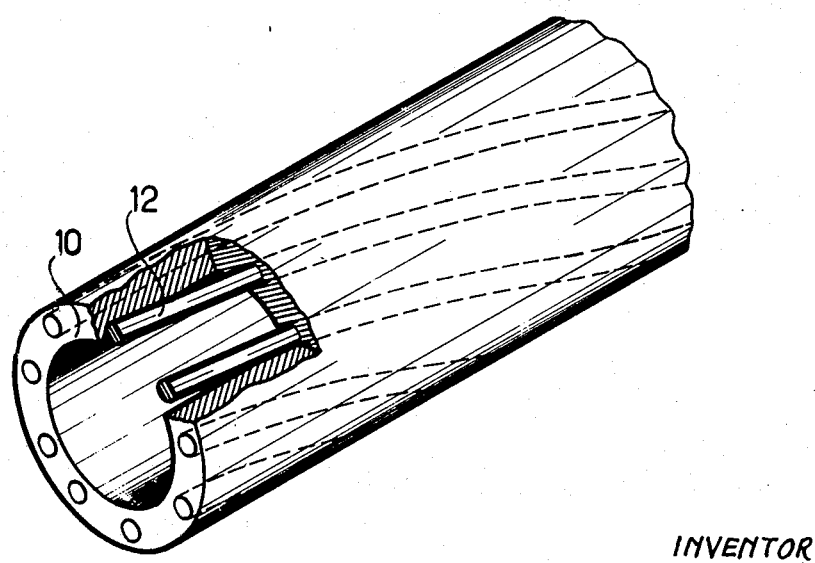

FIG. 2 illustrates a hollow cylindrical tube 10 in which the superconductor strands 12 are disposed helically around the cavity of the tube. This may be effected by permanent deformation by twisting the tube illustrated in FIG. 1.

Figure 3:
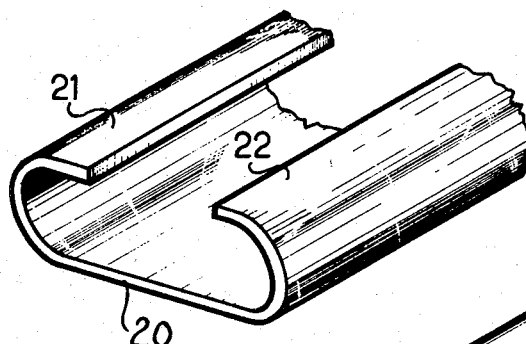
FIGS. 3 and 4 are perspective views illustrating two types of bases.

FIG. 3 illustrates a construction of the base 20 formed from a strip whose edges 21 and 22 are bent over on the same side.

Figure 4:
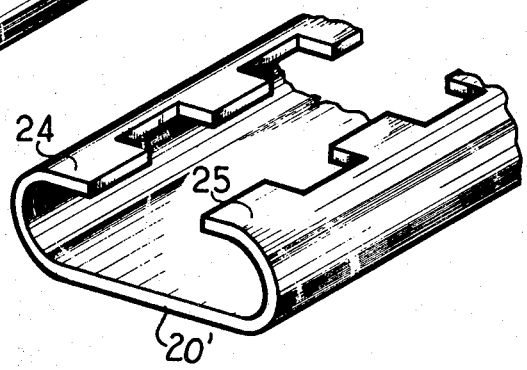

The base 20' illustrated in FIG. 4 is distinguished from the preceding one in that the edges 24 and 24 are limited by a nonrectilinear line, for example in the form of square serrations or the like.

From a tube as illustrated in FIG. 1 or in FIG. 2, and a base as illustrated in FIG. 3 or in FIG. 4, a cable is produced by applying, for example by extrusion, further material of good conductivity, which surrounds the tube and penetrates under the edges of the base to form the hollowed member or portion 30. For example, the cable illustrated in FIG. 5 is obtained by disposing a tube 10 as illustrated in FIG. 2 on a base 20 as illustrated in FIG. 3, and applying the portion 30 by extrusion in order to obtain a cable of square or rectangular external cross section, one side of which is formed by the base 20. The interior 35 of the cylinder constitutes the channel for the circulation of the cryogenic fluid. In order to obtain satisfactory results, it is important to ensure that, during the extrusion, the electric contact between the tube 10 and the portion 30 is excellent and that the filling of the zones 31 and 32 situated on the bentover edges of the base is correct.

By using a base consisting of strong material such as steel or stainless steel, it is possible to obtain, with equal overall dimensions, a cross section of material of low conductivity (pure aluminum) which is larger than in the case of a sheathing formed from an aluminum alloy or in the case of the provision of stranded steel filaments within the cable and therefore a higher permitted current density or a better stability.

This construction also renders possible a readier shaping, for example for the production of coils. Moreover, it is possible to dispose elements, for example by fixation, on the base for the purpose of anchoring, notably in order to prevent creeping of a conductor of great length on a declivity or in order to maintain it in a vertical position. It is also convenient to connect two cable ends by locally separating the base from the corresponding conductor in order to connect mechanically the two ends of the bases on the one hand and to make the electric and hydraulic connections at the ends of the conductors.

The helical arrangement of the superconductor strands (FIG. 2) prevents nonuniform distribution of the current between the strands of one and the same conductor.

Since the present invention is in no way limited to the embodiment described by way of example, any means may be replaced by equivalent means without departing from the scope of the invention.

What is claimed is:

1. A stabilized superconduc,ing cable comprising:
    a hollow member consisting of material having very low resistivity at low temperature,
    a plurality of superconductor elements, in the form of wires or strips, which are embedded in the hollow member and distributed around the cavity thereof, and
    a base consisting of material having high-mechanical strength rigidly coupled to said hollow member, said base bearing against one of the faces of said hollow member and comprising two edges which are bent over and embedded in said hollow member.

2. The stabilized superconducting cable according to claim 1, wherein said superconductor elements are helically disposed around the cavity of said hollow member.

* * * * *